United States Patent

Baude et al.

[11] Patent Number: 5,912,719
[45] Date of Patent: Jun. 15, 1999

[54] CONTACT LENS WITH PALPEBRAL BOSSES

[75] Inventors: Dominique Baude, Saint Quen; Florence Bouchard, Chateau-Ville-Vieille; Nicolas Chateau, Paris; Didier Bernardet, Bussy Saint Georges, all of France

[73] Assignee: Essilor International Compagnie Generale d'Optique, Charenton Le Pont, France

[21] Appl. No.: 09/036,687

[22] Filed: Mar. 9, 1998

[30] Foreign Application Priority Data

Mar. 17, 1997 [FR] France .................................. 97 03176

[51] Int. Cl.[6] ...................................................... G02C 7/04
[52] U.S. Cl. ...................... 351/160 R; 351/161; 351/177
[58] Field of Search ........................... 351/160 R, 160 H, 351/161, 162, 177

[56] References Cited

U.S. PATENT DOCUMENTS 3,698,802 10/1972 Baron .................................. 351/160 H
4,859,049 8/1989 Muller .................................. 351/161
5,100,225 3/1991 Rothe .................................. 351/160 H
5,125,728 6/1992 Newman et al. .................... 351/160 H

FOREIGN PATENT DOCUMENTS 0042023 12/1981 European Pat. Off. .
0452549 10/1991 European Pat. Off. .
8907303 8/1989 WIPO .

*Primary Examiner*—Scott J. Sugarman
*Attorney, Agent, or Firm*—Young & Thompson

[57] ABSTRACT

A contact lens has at least one palpebral boss projecting locally from its external surface in its peripheral area. The palpebral boss is globally elongate in a circumferential direction and the slope P of its crest line at both circumferential ends is in the range 0.020 to 0.140 and preferably in the range 0.040 to 0.080. Applications include contact lenses for centered optical correction and contact lenses for presbyopia.

20 Claims, 1 Drawing Sheet

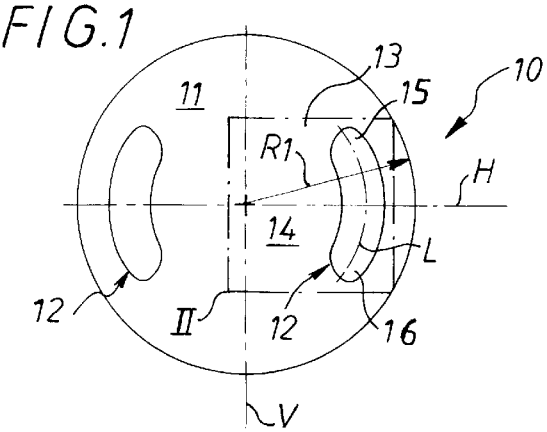
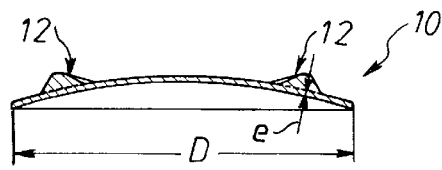
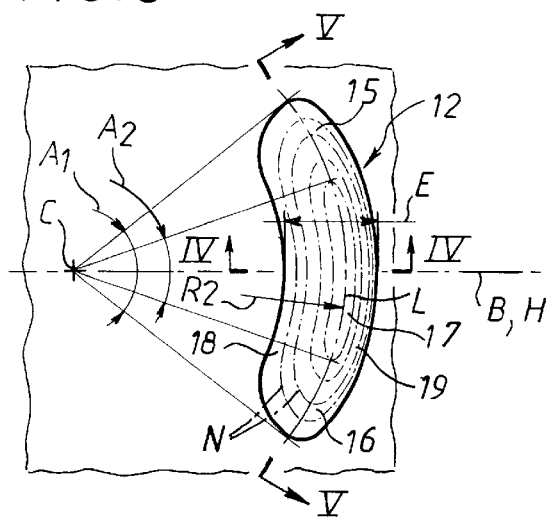
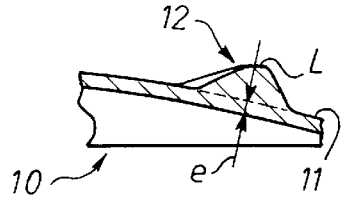
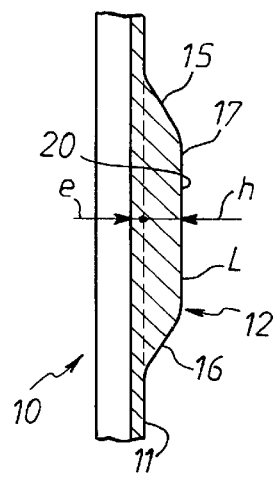
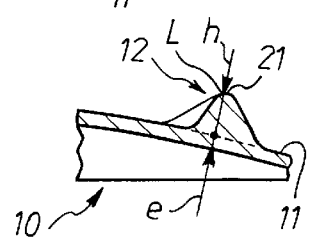
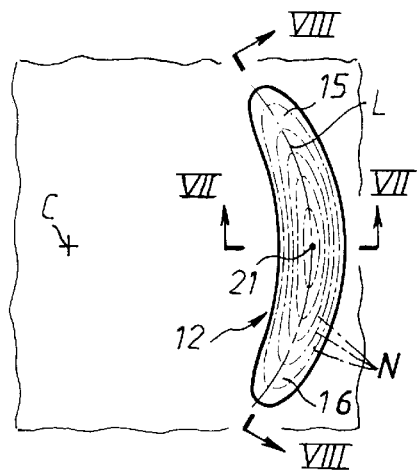
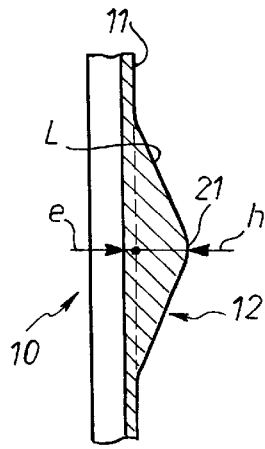

CONTACT LENS WITH PALPEBRAL BOSSES

BACKGROUND OF THE INVENTION

1. Field of the Invention

The present invention concerns contact lenses which, to stabilize them dynamically, have at least one palpebral boss projecting locally from their external surface in their peripheral area, i.e. at a distance from their active central area.

Here "palpebral boss" means, in the usual way, a boss subject to the action of the eyelids each time the latter blink.

The required dynamic stabilization is precisely the result of this action.

The invention is more particularly, but not necessary exclusively, directed to contact lenses for centered optical correction, for example toroidal contact lenses and contact lenses for presbyopia.

2. Description of the Prior Art

European patent No. 0 042 023 concerns a centered optical correction contact lens including palpebral bosses.

However, this European patent gives no geometrical information on the palpebral bosses independently of their thickness, or height.

Experience shows that this geometry conditions the effectiveness of the palpebral bosses concerned, both in terms of the required dynamic stabilization and in terms of the comfort of the wearer of a contact lens including such palpebral bosses.

A general object of the present invention is to optimize this geometry.

SUMMARY OF THE INVENTION

To be more precise, the present invention consists in a contact lens including at least one palpebral boss projecting locally from its external surface in its peripheral area wherein said palpebral boss is globally elongate in a circumferential direction and the slope P of its crest line at both of its circumferential ends is in the range 0.020 to 0.140 and preferably in the range 0.040 to 0.080.

Surprisingly, and inexplicably in practise, it is found that with the above values of slope for the crest line of the palpebral bosses at their circumferential ends a good compromise can be found between the required dynamic stabilization and the comfort of the wearer, other things being equal.

In a first feasible embodiment the crest line of a palpebral boss in accordance with the invention includes a flat in its middle area.

In this case for the wearer to be comfortable the maximal height of the palpebral boss measured in practise at the level of the flat on its crest line is not more than 0.2 mm.

Alternatively, in a second feasible embodiment, the crest line of a palpebral boss in accordance with the invention has a peak in its middle area.

In this case, for good dynamic stabilization the maximal height of the palpebral boss measured in practise at the peak of its crest line is not less than 0.2 mm and can be up to 0.25 mm, for example, without compromising the comfort of the wearer.

In all cases the crest line of a palpebral boss in accordance with the invention preferably extends along a circular arc, the palpebral boss itself being preferably curved overall in a circular arc shape.

The invention, its features and its advantages will become more apparent from the following description given by way of example with reference to the accompanying diagrammatic drawings.

BRIEF DESCRIPTION OF THE DRAWINGS

FIG. 1 is a elevation view of a contact lens in accordance with the invention including two palpebral bosses.

FIG. 2 is a view of the lens in diametral section taken along the line II—II in FIG. 1.

FIG. 3 shows the detail III of one of the palpebral bosses from FIG. 1 to a larger scale.

FIG. 4 is a fragmentary view of the palpebral boss in cross-section taken along the line IV—IV in FIG. 3.

FIG. 5 is a view of the palpebral boss developed flat in circumferential section taken along its crest line, the line V—V in FIG. 3.

FIGS. 6, 7 and 8 are views respectively analogous to those of FIGS. 3, 4 and 5 concerning a different embodiment.

DETAILED DESCRIPTION OF THE PREFERRED EMBODIMENTS

As can be seen in FIG. 1, and in a manner that is known in itself, the contact lens 10 in accordance with the invention is generally disc-shape, domed to a greater or lesser extent and having a circular peripheral contour.

R1 denotes the radius, i.e. half the diameter, of its peripheral contour.

In a manner that is also known in itself the contact lens 10 of the invention has at least one palpebral boss 12 projecting locally from its external surface 11, i.e. its front surface, for stabilizing it dynamically.

As shown here, it preferably includes two palpebral bosses 12 symmetrically disposed on respective opposite side of its vertical diametral plane V.

The palpebral bosses 12 are in the peripheral area 13 of the contact lens 10, i.e. at a distance from its active central area 14.

To make the configuration of the palpebral bosses 12 more apparent, their contour lines N are shown in chain-dotted line in FIGS. 3 and 6.

In the embodiments shown the two palpebral bosses 12 have identical configurations.

Thus only one of them will be described hereinafter.

In accordance with the invention the palpebral boss 12 is elongate circumferentially, along a circular sector, and between its top and bottom circumferential ends 15, 16 the slope P of its crest line L is in the range 0.020 to 0.140 and preferably in the range 0.040 to 0.080.

The crest line L is shown in chain-dotted line in FIGS. 3 and 6.

Lying in the picture plane of FIGS. 5 and 8, it is shown in continuous line in FIGS. 5 and 8.

In the embodiments shown the crest line L of a palpebral boss 12 in accordance with the invention extends along a circular arc.

The radius R2 of the circular arc is preferably in the range 0.7 times to 0.9 times the radius R1 of the contact lens 10 as defined above.

For example, if the contact lens 10 has an outside diameter in the range 14 mm to 15 mm the radius of the circular arc along which the crest line L of a palpebral boss 12 of the invention extends is in the range 4.9 mm to 6.8 mm.

In the embodiments shown the palpebral boss 12 of the invention itself has a globally circular arc shape, resembling a banana.

In the embodiments shown the angle A1 subtended at the center by the whole of the palpebral boss 12 is in the range 60° to 150°.

The angle A1 at the center is around 70°, for example.

In the embodiments shown the palpebral boss 12 of the invention is symmetrical about a diametral plane passing through its middle area 17.

To be more precise, in these embodiments, and by way of example, the bissector B of the angle A1 subtended at the center by the palpebral boss 12 of the invention lies in the horizontal diametral plane H of the contact lens 10, this horizontal diametral plane H being in practise the stabilization plane of the contact lens 10.

This is not necessarily so, however, the diametral plane of symmetry of a palpebral boss 12 of the invention, if the palpebral boss 12 has a diametral plane of symmetry, possibly being at a greater or lesser distance from the horizontal diametral plane H of the contact lens 10, as specified below.

Be this as it may, a palpebral boss 12 of the invention has on respective opposite sides of its crest line L an inside flank 18 facing towards the center C of the contact lens 10 and an outside flank 19 facing the opposite way.

Relative to the axis of the contact lens 10, i.e. relative to a straight line passing through the center of the latter and normal to the plane of its peripheral contour, the inside flank 18 is globally concave and the outside flank 19 is globally convex.

In the embodiment shown more particularly in FIGS. 3 to 5 the crest line L of the palpebral boss 12 of the invention has a flat 20 in its middle area 17.

In other words, the maximal height h of the palpebral boss 12 as measured relative to the outside surface 11 from which it projects is substantially constant between its circumferential ends 15, 16 along all of its middle area 17, where it forms the flat 20.

In this case, the maximal height h of the palpebral boss 12, which is that of the flat 20 on its crest line L, is preferably not greater than 0.2 mm.

More generally, the maximal height h is not greater than 1.6 times the thickness e of the contact lens 10 on a vertical through the crest line L and is preferably in the range 0.7 times to 1.4 times the thickness e.

The angle A2 subtended at the center by the flat 20 is preferably not less than one-quarter the angle A1 subtended by the whole of the palpebral boss 12 and not more than half the latter angle.

For example, if the angle A1 subtended at the center by the whole of the palpebral boss 12 is in the order of 100° the angle A2 subtended by the flat 20 on the crest line L can be in the order of 30°.

At its base, i.e. at the outside surface 11 from which it projects, a palpebral boss 12 of the invention has a width which is maximal in the diametral plane passing through its middle area 17, i.e. in the horizontal diametral plane H of the contact lens 10 in the embodiment shown; whilst it can be relatively constant over a portion of its length on either side of this diametral plane, its width decreases towards its circumferential ends 15, 16.

E denotes its maximal thickness, i.e. its thickness in the diametral plane passing through its middle area 17.

The maximal thickness E is preferably in the range 0.25 times to 0.46 times the radius R1 of the contact lens 10.

For example, if, as shown in FIGS. 3 to 5, the crest line L of the palpebral boss 12 of the invention includes a flat 20, the maximal thickness E is closer to 0.46 times the radius R1 of the contact lens 10 than to 0.25 times the radius R1, preferably being close to 0.40 times the latter.

In the diametral plane through the middle area 17 of the palpebral boss 12 of the invention, i.e. in the horizontal diametral plane H of the contact lens 10 in these embodiments, the slope P'1, P'2 of the line of greatest slope of the palpebral boss 12 is in the range 0.07 to 0.275.

In the embodiment more particularly shown in FIGS. 3 to 5 the palpebral boss 12 has on respective opposite sides of its crest line L asymmetric inside and outside flanks 18, 19.

As shown here, for example, the inside flank 18 is less steep than the outside flank 19.

The slope P'1 of its line of greatest slope is therefore less than that P'2 of the line of greatest slope of the outside flank 19.

The slope P'2 of the line of greatest slope of whichever of the inside and outside flanks 18 and 19 is steeper, here the outside flank 19, is in the range 0.160 to 0.200.

Of course, the slopes P in the circumferential direction and the slopes P'1 and P'2 in the diametral direction depend on the maximal height h of the palpebral boss 12.

The slope P also depends on the angle A1 subtended at the center by the whole of the palpebral boss 12 and on the angle A2 subtended at the center by the flat 20 on its crest line L.

The slopes P'1 and P'2 also depend on the maximal thickness E of the palpebral boss 12 as well as its maximal height h.

Satisfactory numerical values are given below by way of example and without any intention of limiting the invention for a contact lens 10 in which the radius R1 is equal to 7.1 mm and assuming that the palpebral boss 12 has a maximal thickness E equal to 2.66 mm and that the angle A2 subtended at the center by the flat 20 on its crest line L is equal to 30°.

|                | for A1 = 100° | for A1 = 70° | for A1 = 140° |
| --- | --- | --- | --- |
| for h = 0.17 mm | P = 0.047 | P = 0.083 | P = 0.03 |
| for h = 0.20 mm | P = 0.056 | P = 0.098 | P = 0.035 |
|                |           | P'1       | P'2       |
| for h = 0.17 mm |          | 0.10      | 0.167     |
| for h = 0.20 mm |          | 0.122     | 0.196     |

In the embodiment shown in FIGS. 6 to 8 the crest line L of a palpebral boss 12 of the invention has a peak 21 in its middle area 17 rather than a flat 20 as previously.

In other words, from one its circumferential ends 15, 16 to the other the slope P of its crest line L first increases and then decreases, in a shape resembling a peaked cap.

In this case the maximal height h of the palpebral boss 12 of the invention is not less than 0.2 mm and not more than 0.24 mm.

More generally, and as previously, the maximal height h is not greater than 1.6 times the thickness e of the contact lens 10 on a vertical through the crest line L and is preferably in the range 0.7 times to 1.4 times the thickness e.

The maximal thickness E of the palpebral boss 12 is then closer to 0.25 times the radius R1 of the contact lens 10 than 0.46 times the radius R1, preferably being close to 0.25 times the latter.

In the embodiment shown the palpebral boss 12 of the invention has on respective opposite sides of its crest line L symmetrical inside and outside flanks 18, 19.

In other words, the slopes P'1, P'2 of the lines of greatest slope of the inside and outside flanks 18, 19 are substantially identical.

Satisfactory numerical values are given below, by way of example, and for the same conditions as above, for a palpebral boss 12 of the above kind assuming that its maximal thickness E is substantially equal to 2.04 mm.

|  | P | P'1 | P'2 |
|---|---|---|---|
| for h = 0.20 mm | 0.039 | 0.196 | 0.196 |
| for h = 0.24 mm | 0.047 | 0.235 | 0.235 |

Of course, the present invention is not limited to the embodiments described and shown but encompasses any variant execution and/or combination of their various component parts.

In particular, and as previously indicated, a palpebral boss of the invention can be off-axis relative to the horizontal to a greater or lesser degree.

In other words, the bissector of the angle that it subtends at the center can depart to a greater or lesser degree from the horizontal diametral plane of the contact lens, for example in the range from 35° above this horizontal diametral plane to 60° below it.

Similarly, a palpebral boss of the invention is not necessarily symmetrical relative to the diametral plane of the contact lens passing through its middle area, i.e. relative to the diametral plane of the contact lens passing through the bissector of the angle that it subtends at the center.

To the contrary, its crest line can have different slopes at its opposite circumferential ends, for example.

There is claimed:

1. A contact lens including at least one palpebral boss projecting locally from its external surface in its peripheral area wherein said palpebral boss is globally elongate in a circumferential direction and the slope P of its crest line at both of its circumferential ends is in the range 0.020 to 0.140 and preferably in the range 0.040 to 0.080.

2. The contact lens claimed in claim 1 wherein said crest line of said palpebral boss includes a flat in its middle area.

3. The contact lens claimed in claim 2 wherein said flat on said crest line of said palpebral boss subtends an angle at the center not less than one-quarter that subtended by the whole of said palpebral boss.

4. The contact lens claimed in claim 3 wherein said flat on said crest line of said palpebral boss subtends an angle at the center not more than one-half that subtended by the whole of said palpebral boss.

5. The contact lens claimed in claim 1 wherein said crest line of said palpebral boss includes a peak in its middle area.

6. The contact lens claimed in claim 1 wherein said palpebral boss has a maximal height not greater than 1.6 times the thickness of said contact lens on a vertical through said crest line and preferably in the range 0.7 times to 1.4 times said thickness.

7. The contact lens claimed in claim 2 wherein said palpebral boss has a maximal height not greater than 1.6 times the thickness of said contact lens on a vertical through said crest line and preferably in the range 0.7 times to 1.4 times said thickness and said maximal height of said palpebral boss is not greater than 0.2 mm.

8. The contact lens claimed in claim 5 wherein said palpebral boss has a maximal height not greater than 1.6 times the thickness of said contact lens on a vertical through said crest line and preferably in the range 0.7 times to 1.4 times said thickness and said maximal height of said palpebral boss is not less than 0.2 mm.

9. The contact lens claimed in claim 8 wherein said maximal height of said palpebral boss is not greater than 0.24 mm.

10. The contact lens claimed in claim 1 wherein said crest line of said palpebral boss extends along a circular arc.

11. The contact lens claimed in claim 10 wherein said circular arc along which said crest line of said palpebral boss extends has a radius in the range 0.7 times to 0.9 times the radius of the contact lens.

12. The contact lens claimed in claim 10 wherein said palpebral boss is globally curved in a circular arc shape.

13. The contact lens claimed in claim 1 wherein said palpebral boss subtends an angle at the center in the range 60° to 150°.

14. The contact lens claimed in claim 1 wherein the slope of the line of greatest slope of said palpebral boss is in the range 0.07 to 0.275 in a diametral plane passing through its middle area.

15. The contact lens claimed in claim 1 wherein said palpebral boss has asymmetric inside and outside flanks on respective opposite sides of its crest line.

16. The contact lens claimed in claim 14 wherein said palpebral boss has asymmetric inside and outside flanks on respective opposite sides of its crest line and the slope of said line of greatest slope of whichever of said inside and said outside flanks is the more steep is in the range 0.160 to 0.200.

17. The contact lens claimed in claim 15 wherein said inside flank of said palpebral boss is less steep than its outside flank.

18. The contact lens claimed in claim 1 wherein said palpebral boss has symmetrical inside and outside flanks on respective opposite sides of its crest line.

19. The contact lens claimed in claim 1 wherein said palpebral boss has a maximal thickness at its base in the range 0.25 times to 0.46 times the radius of the contact lens.

20. A contact lens as claimed in claim 1 including two palpebral bosses symmetrically disposed on respective opposite sides of its vertical diametral plane.

* * * * *